(12) United States Patent
Cui et al.

(10) Patent No.: US 12,549,237 B2
(45) Date of Patent: *Feb. 10, 2026

(54) LAYER 1 AND LAYER 3 MEASUREMENT COORDINATION

(71) Applicant: Apple Inc., Cupertino, CA (US)

(72) Inventors: Jie Cui, San Jose, CA (US); Yang Tang, San Jose, CA (US); Yihong Qi, Santa Clara, CA (US); Herbert R Dawid, Herzogenrath (DE); Panagiotis Botsinis, Munich (DE); Dawei Zhang, Saratoga, CA (US); Hong He, San Jose, CA (US); Manasa Raghavan, Sunnyvale, CA (US); Qiming Li, Beijing (CN); Xiang Chen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,532

(22) Filed: Jun. 6, 2024

(65) Prior Publication Data

US 2024/0322890 A1    Sep. 26, 2024

Related U.S. Application Data

(63) Continuation of application No. 17/593,281, filed as application No. PCT/CN2021/070446 on Jan. 6, 2021, now Pat. No. 12,009,897.

(51) Int. Cl.
*H04B 7/06* (2006.01)
*H04L 5/00* (2006.01)
*H04W 24/10* (2009.01)

(52) U.S. Cl.
CPC .......... *H04B 7/0652* (2013.01); *H04B 7/0626* (2013.01); *H04L 5/0051* (2013.01); *H04W 24/10* (2013.01)

(58) Field of Classification Search
CPC ..... H04B 7/065; H04B 7/0626; H04L 5/0051; H04W 24/10
See application file for complete search history.

(56) References Cited

U.S. PATENT DOCUMENTS

| | | | | |
|---|---|---|---|---|
| 10,892,927 | B2 * | 1/2021 | Lin | H04L 5/0048 |
| 11,245,440 | B2 * | 2/2022 | Hwang | H04W 72/30 |
| 11,330,575 | B2 * | 5/2022 | Lin | H04L 1/0026 |
| 12,316,467 | B2 * | 5/2025 | Wu | H04L 1/206 |
| 2018/0262313 | A1 * | 9/2018 | Nam | H04L 5/0044 |

FOREIGN PATENT DOCUMENTS

EP    4550737 A1 *  5/2025   ............ H04B 7/063

* cited by examiner

*Primary Examiner* — Deepa Belur
(74) *Attorney, Agent, or Firm* — Fay Kaplun & Marcin, LLP

(57) ABSTRACT

A user equipment (UE) may be configured to perform layer 1 (L1) measurement procedures and layer 3 (L3) measurement procedures. The UE configures a channel state information-reference signal (CSI-RS) layer 3 (L3) measurement window, identifies a collision between a layer 1 (L1) measurement operation and a L3 measurement operation and omits at least one L1 measurement in response to identifying the collision.

18 Claims, 21 Drawing Sheets

LAYER 1 AND LAYER 3 MEASUREMENT COORDINATION

BACKGROUND

A user equipment (UE) may connect to multiple different networks or types of networks. To maintain the network connection, the UE may be configured to perform layer 1 (L1) measurement procedures and layer 3 (L3) measurement procedures. In some scenarios, a L1 measurement occasion may overlap in time with a L3 measurement window. When there is an overlap, for any of a variety of different reasons, the UE may be unable to adequately perform both L1 and L3 measurements.

SUMMARY

Some exemplary embodiments are related to a processor configured to perform operations. The operations include configuring a channel state information-reference signal (CSI-RS) layer 3 (L3) measurement window, identifying a collision between a layer 1 (L1) measurement operation and a L3 measurement operation and omitting at least one L1 measurement in response to identifying the collision.

Other exemplary embodiments are related to user equipment (UE) including a transceiver configured to communicate with a network and a processor communicatively coupled to the transceiver and configured to perform operations. The operations include configuring a channel state information-reference signal (CSI-RS) layer 3 (L3) measurement window, identifying a collision between a layer 1 (L1) measurement operation and a L3 measurement operation and omitting at least one L1 measurement in response to identifying the collision.

DETAILED DESCRIPTION

Figure 1:
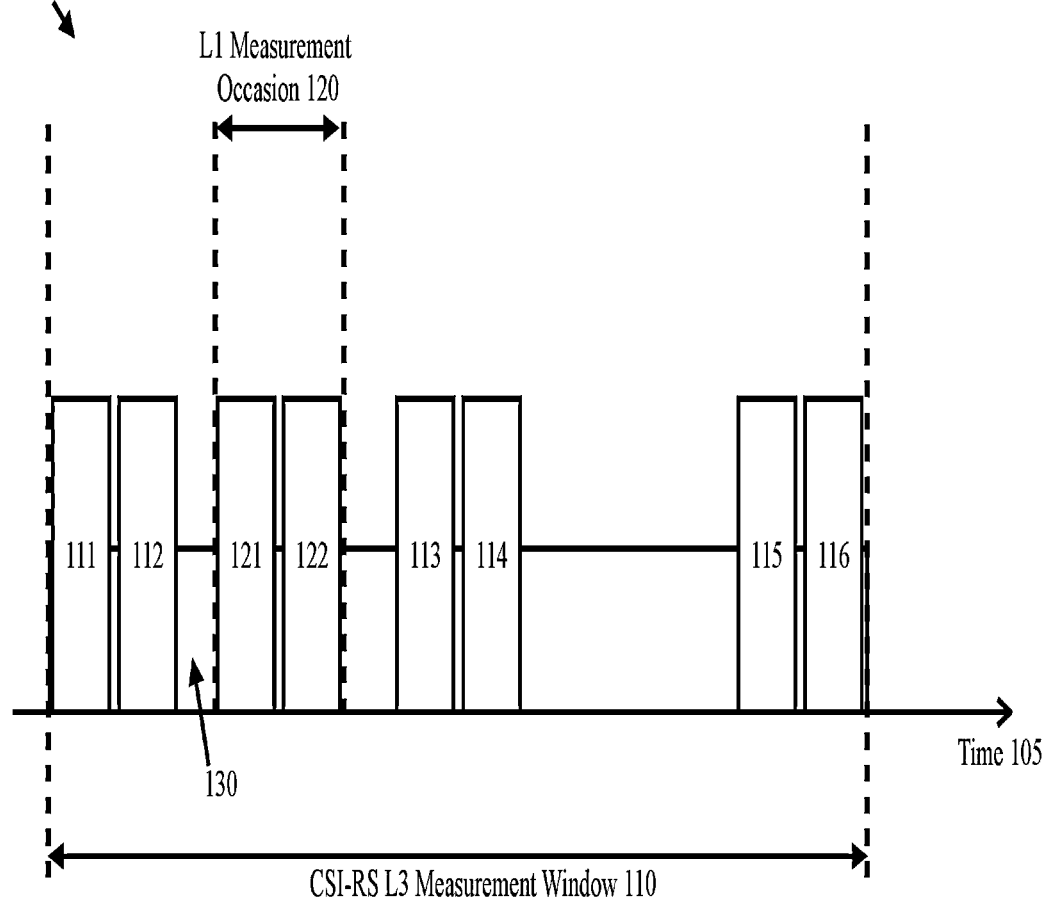
FIG. 1 illustrates a scenario in which a layer 1 (L1) measurement occasion overlaps in time with a channel state information-reference signal (CSI-RS) layer 3 (L3) measurement window.

The exemplary embodiments may be further understood with reference to the following description and the related appended drawings, wherein like elements are provided with the same reference numerals. The exemplary embodiments relate to a scenario in which a user equipment (UE) experiences a collision between local layer 1 (L1) measurement operations and local layer 3 (L3) measurement operations.

When there is a collision between L1 measurement operations and a L3 measurement operations, the UE may be unable to perform both the L1 and L3 measurements. As will be described in more detail below, the exemplary embodiments address this issue by implementing a coordination scheme that allows the UE to manage L1 and L3 measurements in a manner that does not negatively impact the measurement performance and/or user experience of the UE.

The exemplary embodiments are described with regard to the UE being configured to perform signal synchronization block (SSB) based L1 measurements and/or channel state information-reference signal (CSI-RS) based L1 measurements. Those skilled in the art will understand that L1 relates to the physical layer between the UE and the network. Some examples may be described with regard to the SSB/CSI-RS based L1 measurements being performed for radio link management (RLM) and/or beam failure detection (BFD) corresponding to a serving cell. However, these examples are merely provided for illustrative purposes. The exemplary embodiments may apply to any appropriate type of SSB/CSI-RS based L1 measurements being performed for any purpose.

The exemplary embodiments are also described with regard to the UE being configured to perform CSI-RS based L3 measurements. Those skilled in the art will understand that L3 relates to the radio resource control (RRC) layer. Some examples may be described with regard to the CSI-RS based L3 measurements corresponding to a neighbor cell (e.g., a target cell) being performed for mobility management. However, these examples are merely provided for illustrative purposes. The exemplary embodiments may apply to any appropriate type of CSI-RS based L3 measurements being performed for any purpose.

As indicated above, the exemplary embodiments relate to a scenario in which there is a collision between L1 and L3 measurement operations. The collision may occur when a measurement occasion configured for a L1 measurement procedure overlaps in time with a measurement window configured for a L3 measurement procedure. Throughout this description, the term "L1 measurement occasion" represents a time duration during which a cell may transmit SSB and/or CSI-RS that may be used by the UE for L1 measurements. Throughout this description, the measurement window configured for an L3 measurement procedure shall be referred to by the term "CSI-RS L3 measurement window." The CSI-RS L3 measurement window represents a time duration during which one or more cells may transmit CSI-RS that may be used by the UE for L3 measurements. The terms "L1 measurement occasion" and "CSI-RS L3 measurement window" are merely provided for illustrative purposes, different entities may refer to similar concepts by different names.

Those skilled in the art will understand the intended purpose of the L1 measurement occasion, the intended purpose of the CSI-RS L3 measurement window and the manner in which these mechanisms may be configured at the UE. However, these aspects are beyond the scope of the exemplary embodiments. Instead, the exemplary embodiments are directed towards a scenario in which there is a collision between L1 measurement operations and L3 measurement operations at the UE.

FIG. 1 illustrates a scenario 100 in which a L1 measurement occasion overlaps in time with a CSI-RS L3 measurement window. The scenario 100 depicts one example of a collision between L1 measurement operations and L3 measurement operations at the UE. Additional examples and the scope of the term "collision" will be described in more detail below.

The scenario 100 shows the time domain 105, the CSI-RS L3 measurement window 110 and the L1 measurement occasion 120. In this example, a neighbor cell transmits CSI-RS symbols 111-116 during the CSI-RS L3 measurement window 110 and a serving cell transmits SSBs 121-122 during the L1 measurement occasion 120. Those skilled in the art will understand how the UE may receive the CSI-RS symbols 111-116 and generate CSI-RS based L3 measurements. Similarly, those skilled in the art will understand how the UE may receive the SSBs 121-122 and generate SSB based L1 measurements.

While the CSI-RS L3 measurement window 110 and the L1 measurement occasion 120 overlap in time, at the symbol level, the L1 resources (e.g., SSBs 121-122) may not overlap with the L3 resources (e.g., CSI-RS 111-116). In the scenario 100, an example of the spacing between symbols is shown by the reference number 130.

Due to the spacing, the UE may be unable to perform the L1 measurements and the L3 measurements concurrently. In addition, due to any of a variety of different factors such as, but not limited to, the bandwidth difference between the L1 resources and the L3 resources, the UE may be unable to transition between baseband configurations in a timely enough manner for successful reception and/or measurement of the L1 resources (the bandwidth difference is not pictured in FIG. 1). Consequently, when there is a collision between L1 and L3 measurement operations, these types of issues may prevent the UE from being able to perform both the L1 and the L3 measurements.

The exemplary embodiments relate to implementing a coordination scheme that allows the UE to manage L1 and L3 measurements in a manner that does not negatively impact the performance and/or user experience of the UE. In a first aspect, the exemplary embodiments include various CSI-RS L3 measurement window designs. Generally, the designs differ in how one or both of the CSI-RS L3 measurement window boundaries are defined. As will be described in more detail below, a collision between L1 and L3 measurement operations may be based, at least in part, on the configuration of the CSI-RS L3 measurement window. Some embodiments relate a CSI-RS L3 measurement window where the window duration is fixed. Specific examples of types of fixed CSI-RS L3 measurement windows are described in detail below with regard to FIGS. 4a-4d. Other embodiments relate to an adaptive CSI-RS L3 measurement window, specific examples of which will be described below with regard to FIGS. 5a-5d.

In a second aspect, the exemplary embodiments relate to techniques for determining whether there is a collision between L1 and L3 measurement operations. As indicated above, a collision may occur when a CSI-RS L3 measurement window overlaps in time with a L1 measurement occasion. These exemplary techniques may be used with any of the CSI-RS L3 measurement window configurations described herein or any other similar type of measurement window.

In a third aspect, the exemplary embodiments relate to measurement resource sharing techniques. As will be described in more detail below, when there is a collision between L1 and L3 measurement operations, the UE may implement various techniques to adequately balance the L1 and L3 measurements in a manner that does not negatively impact the performance and/or user experience of the UE. Together these aspects may be used to implement a L1 and L3 measurement resource coordination scheme. However, each of these individual aspects may be used in coordination with other currently implemented measurement procedures, future implementations of measurement procedures or independently from other measurement procedures. Specific examples of each of these exemplary aspects are provided below.

Figure 2:
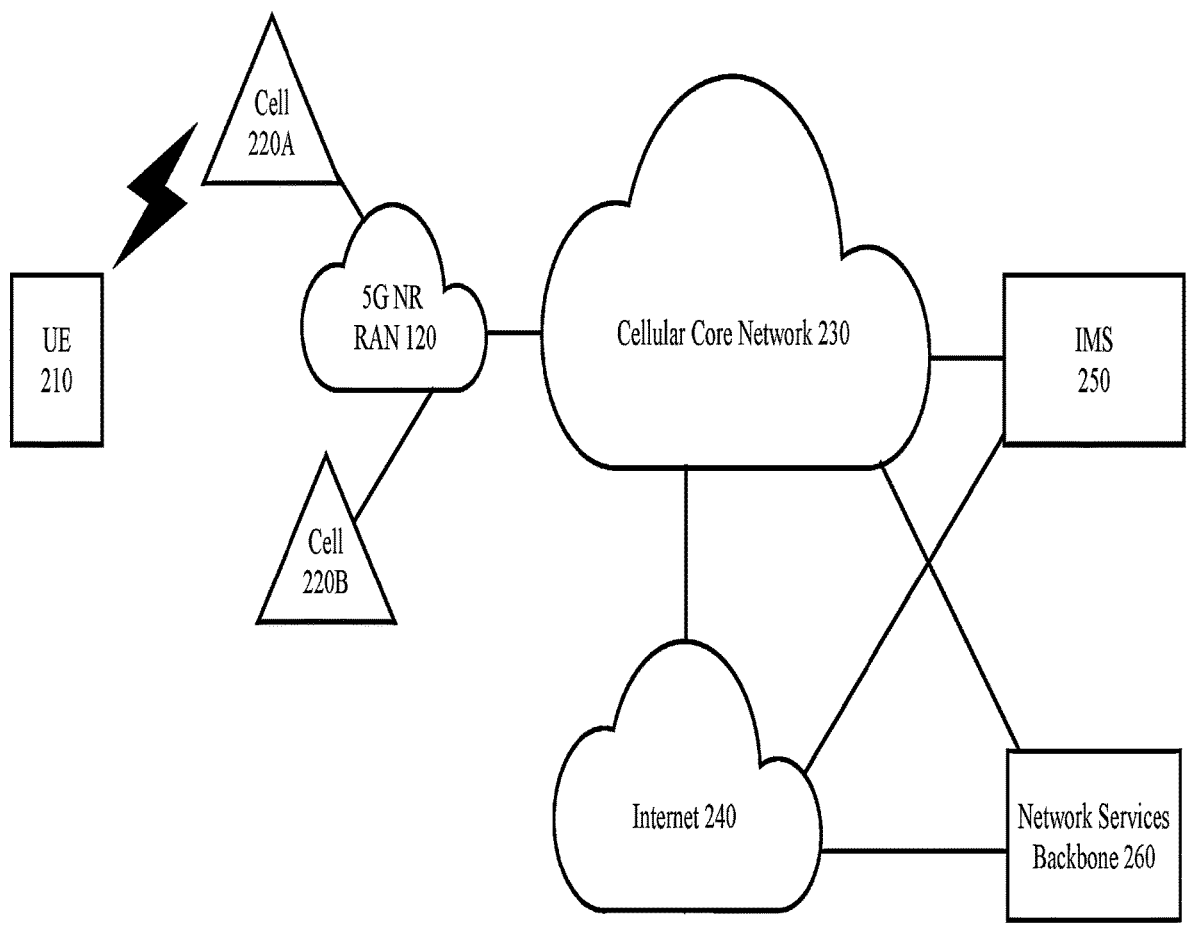
FIG. 2 shows an exemplary network arrangement according to various exemplary embodiments.

FIG. 2 shows an exemplary network arrangement 200 according to various exemplary embodiments. The exemplary network arrangement 200 includes a UE 210. Those skilled in the art will understand that the UE 210 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 210 is merely provided for illustrative purposes.

The UE 210 may be configured to communicate with one or more networks. In the example of the network configuration 200, the network with which the UE 210 may wirelessly communicate is a 5G NR radio access network (RAN) 220. However, the UE 210 may also communicate with other types of networks (e.g., 5G cloud RAN, a next generation RAN (NG-RAN), a long term evolution (LTE) RAN, a legacy cellular network, a WLAN, etc.) and the UE 210 may also communicate with networks over a wired connection. With regard to the exemplary embodiments, the UE 210 may establish a connection with the 5G NR RAN 220. Therefore, the UE 210 may have a 5G NR chipset to communicate with the 5G NR RAN 220.

The 5G NR RAN 220 may be a portion of a cellular network that may be deployed by a network carrier (e.g., Verizon, AT&T, Sprint, T-Mobile, etc.). The 5G NR RAN 220 may include, for example, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In one example, the UE 210 may connect to the 5G NR RAN 220 via a cell 220A and a cell 220B may be deployed within the general location of the UE 210. Thus, the cell 220A may be configured as a serving cell and the cell 220B may be a neighbor cell (or a target cell) relative to the UE 210. To provide one possible example within the context the scenario 100 of FIG. 1, the cell 220A may transmit the SSBs 121-122 during the L1 measurement occasion 120 and the cell 220B may transmit the CSI-RS 111-116 during the CSI-RS L3 measurement window 110.

The cells 220A, 220B may include one or more communication interfaces to exchange data and/or information with camped UEs, the 5G NR RAN 220, the cellular core network 230, the internet 240, etc. Further, the cells 220A, 220B may include a processor configured to perform various operations. For example, the processor may be configured to perform operations related to configuring a CSI-RS L3 measurement window, configuring a L1 measurement occasion, transmitting CSI-RS and transmitting SSBs. However, reference to a processor is merely for illustrative purposes. The operations of the cells 220A, 220B may also be represented as a separate incorporated component of the cell or may be a modular component coupled to the node, e.g., an integrated circuit with or without firmware. For example, the integrated circuit may include input circuitry to receive signals and processing circuitry to process the signals and other information. In addition, in some cells, the functionality of the processor is split among two or more processors such as a baseband processor and an applications processor. The exemplary embodiments may be implemented in any of these or other configurations of a cell.

It will be further understood that any association procedure may be performed for the UE 210 to connect to the 5G NR RAN 220. For example, as discussed above, the 5G NR RAN 220 may be associated with a particular cellular provider where the UE 210 and/or the user thereof has a contract and credential information (e.g., stored on a SIM card). Upon detecting the presence of the 5G NR RAN 220, the UE 210 may transmit the corresponding credential information to associate with the 5G NR RAN 220. More specifically, the UE 210 may associate with a specific cell or base station. As mentioned above, the use of the 5G NR RAN 220 is for illustrative purposes and any appropriate type of RAN may be used.

In addition to the NR RAN 220, the network arrangement 200 also includes a cellular core network 230, the Internet 240, an IP Multimedia Subsystem (IMS) 250, and a network services backbone 260. The cellular core network 230 may be considered to be the interconnected set of components that manages the operation and traffic of the cellular network. It may include the EPC and/or the 5GC. The cellular core network 230 also manages the traffic that flows between the cellular network and the Internet 240. The IMS 250 may be generally described as an architecture for delivering multimedia services to the UE 210 using the IP protocol. The IMS 250 may communicate with the cellular core network 230 and the Internet 240 to provide the multimedia services to the UE 210. The network services backbone 260 is in communication either directly or indirectly with the Internet 140 and the cellular core network 230. The network services backbone 260 may be generally described as a set of components (e.g., servers, network storage arrangements, etc.) that implement a suite of services that may be used to extend the functionalities of the UE 210 in communication with the various networks.

Figure 3:
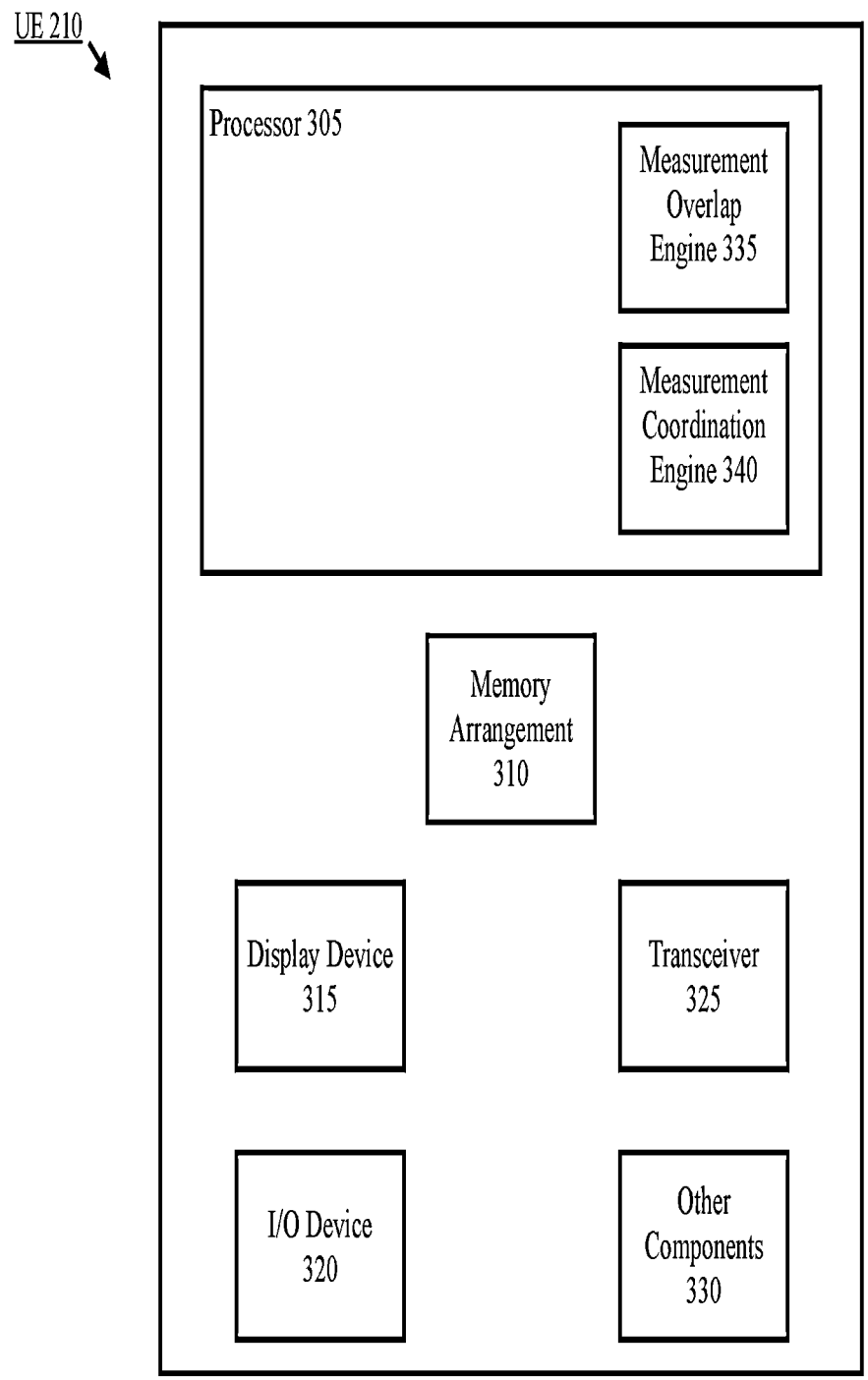
FIG. 3 shows an exemplary user equipment (UE) according to various exemplary embodiments.

FIG. 3 shows an exemplary UE 210 according to various exemplary embodiments. The UE 210 will be described with regard to the network arrangement 200 of FIG. 2. The UE 210 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 210 to other electronic devices, etc.

The processor 305 may be configured to execute a plurality of engines of the UE 210. For example, the engines may include a measurement collision engine 335 and a measurement coordination engine 340. The measurement collision engine 335 may perform operations related to determining whether there is a collision between L1 measurement operations and L3 measurement operations. The measurement coordination engine 340 may be configured to perform operations related to the management of L1 and L3 measurements.

The above referenced engines 335-340 each being an application (e.g., a program) executed by the processor 305 is merely provided for illustrative purposes. The functionality associated with the engines 335-340 may also be represented as a separate incorporated component of the UE 210 or may be a modular component coupled to the UE 210, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 210. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 220, an LTE-RAN (not pictured), a legacy RAN (not pictured), a WLAN (not pictured), etc. Accordingly, the transceiver 325 may operate on a variety of different frequencies or channels (e.g., set of consecutive frequencies).

As mentioned above, the exemplary embodiments relate to implementing a coordination scheme for L1 and L3 measurement procedures. The exemplary embodiments may allow the UE 210 to manage the L1 and L3 measurements when there is a collision between L1 and L3 measurement operations. Specific examples of how the UE 210 may identify a collision between L1 and L3 measurement operations and the type of exemplary measurement resource sharing techniques that may be implemented are described in detail below. However, prior to discussing these aspects, various CSI-RS L3 measurement window designs are described below with regard to FIGS. 4a-4d and 5a-5d.

FIGS. 4a-4d each show an example of a fixed CSI-RS L3 measurement window 410. With this approach, the CSI-RS L3 measurement window duration is fixed to (X) milliseconds (ms). However, reference to (X) ms is merely provided for illustrative purposes, the exemplary embodiments apply to any appropriate window duration length expressed in any appropriate units.

FIGS. 4a-4d each depict the time domain 405, the fixed CSI-RS L3 measurement window 410 and multiple slots 412-416. In addition, the slots may be shown as including multiple CSI-RS L3 symbols (e.g., L3 resources). However, the example arrangements of slots and symbols shown in FIGS. 4a-4d are merely provided for illustrative purposes, the exemplary embodiments may apply to any appropriate arrangement of slots and measurement resources within a measurement window.

As will be described in more detail below, FIGS. 4a-4d each show a different starting point for the fixed CSI-RS L3 410. Since the duration is fixed, the end of the fixed CSI-RS L3 measurement window 410 is determined based on the value of (X).

During operation, the network may configure the UE 210 with a measurement object. Those skilled in the art will understand that the measurement object represents a burst of CSI-RS L3 measurement resources (e.g., symbols, etc.) transmitted by the network. Thus, the network may configure multiple CSI-RS L3 measurement resources within the same measurement object. In the examples shown in FIGS. 4a-4d, the CSI-RS symbol 421 may represent the first configured CSI-RS L3 resource in a burst of CSI-RS configured in the same measurement object.

Figure 4A:
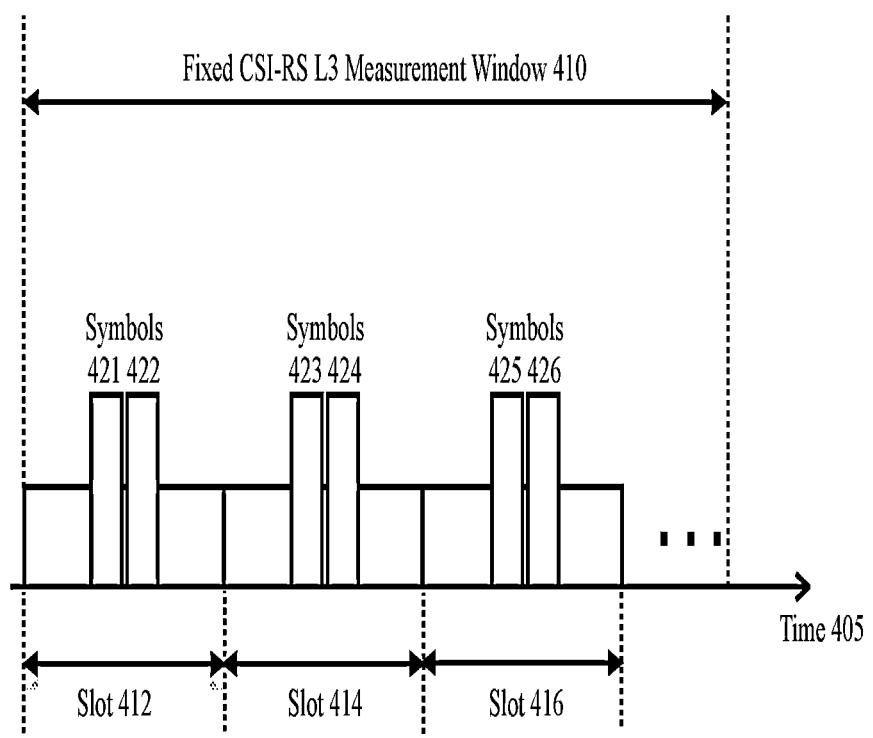
FIGS. 4a-4d each show an example of a fixed CSI-RS L3 measurement window.

In FIG. 4a, slot 412 is shown as including two CSI-RS L3 symbols 421-422, slot 414 is shown as including two CSI-RS L3 symbols 423-424 and slot 416 is shown as including two CSI-RS L3 symbols 425-426.

As shown in FIG. 4a, in one example of a fixed measurement window, the starting point for the fixed CSI-RS L3 measurement window 410 is the starting boundary of a slot in which the first configured CSI-RS L3 resource is located (slot 412). In some embodiments, when the fixed CSI-RS L3 measurement window 410 is configured for intra-frequency measurements, the first CSI-RS L3 symbol 421 may be a serving cell CSI-RS. In other intra-frequency measurement embodiments, the first CSI-RS L3 symbol 421 may be the first arrived CSI-RS from any cell operating on this frequency. In further embodiments, when the fixed CSI-RS L3 measurement window 410 is configured for inter-frequency measurements, the first CSI-RS L3 symbols in 421 may be the first arrived CSI-RS from one of the neighbor cells operating on this frequency.

Figure 4B:
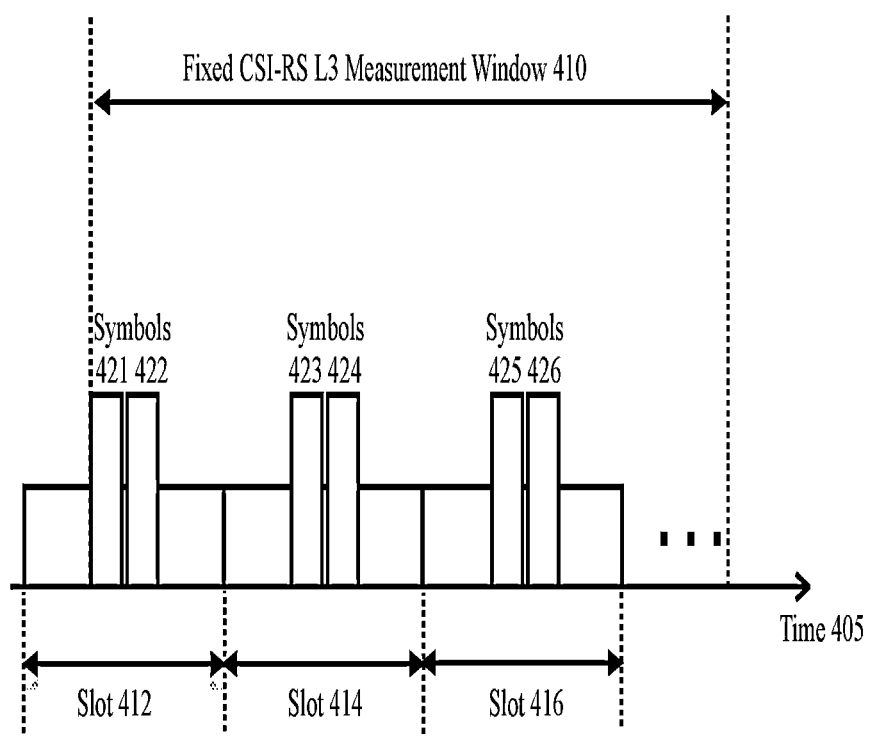

In FIG. 4b, slot 412 is shown as including two CSI-RS L3 symbols 421-422, slot 414 is shown as including two CSI-RS L3 symbols 423-424 and slot 416 is shown as including two CSI-RS L3 symbols 425-426.

As shown in FIG. 4b, in one example of a fixed measurement window, the starting point for the fixed CSI-RS L3 measurement window 410 is the starting boundary of the first configured CSI-RS L3 resource (symbol 421). In some embodiments, when the fixed CSI-RS L3 measurement window 410 is configured for intra-frequency measurements, the first CSI-RS L3 symbol 421 may be a serving cell CSI-RS. In other intra-frequency measurement embodiments, the first CSI-RS L3 symbol 421 may be the first arrived CSI-RS from any cell operating on this frequency. In further embodiments, when the fixed CSI-RS L3 measurement window 410 is configured for inter-frequency measurements, the first CSI-RS L3 symbols in 421 may be the first arrived CSI-RS from one of the neighbor cells operating on this frequency.

Figure 4C:
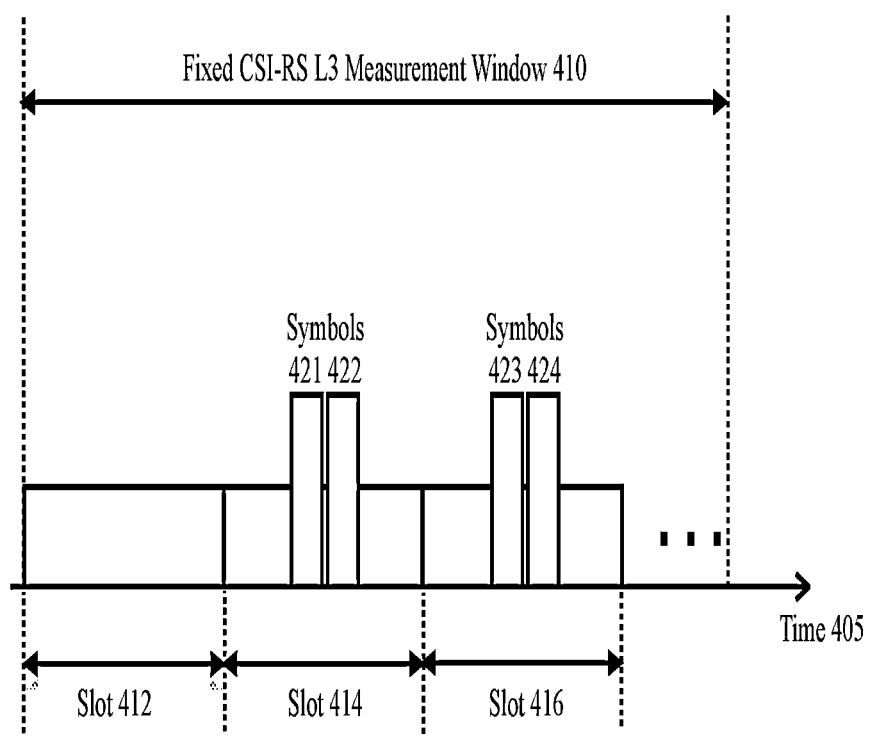

In FIG. 4c, slot 412 is shown as being empty, slot 414 is shown as including two CSI-RS L3 symbols 421-422 and slot 416 is shown as including two CSI-RS L3 symbols 423-424.

As shown in FIG. 4c, in one example of a fixed measurement window, the starting point for the fixed CSI-RS L3 measurement window 410 is the starting boundary of the slot which is a predetermined number of slots (e.g., (Y) slots) before the slot in which the first configured CSI-RS resource 421 is located (slot 412). In this example, Y is equal to one slot. However, in an actual deployment scenario, Y may be equal to any value expressed in any appropriate unit. In some embodiments, when the fixed CSI-RS L3 measurement window 410 is configured for intra-frequency measurements, the first CSI-RS L3 symbol 421 may be a serving cell CSI-RS. In other intra-frequency measurement embodiments, the first CSI-RS L3 symbol 421 may be the first arrived CSI-RS from any cell operating on this frequency. In further embodiments, when the fixed CSI-RS L3 measurement window 410 is configured for inter-frequency measurements, the first CSI-RS L3 symbols in 421 may be the first arrived CSI-RS from one of the neighbor cells operating on this frequency.

Figure 4D:
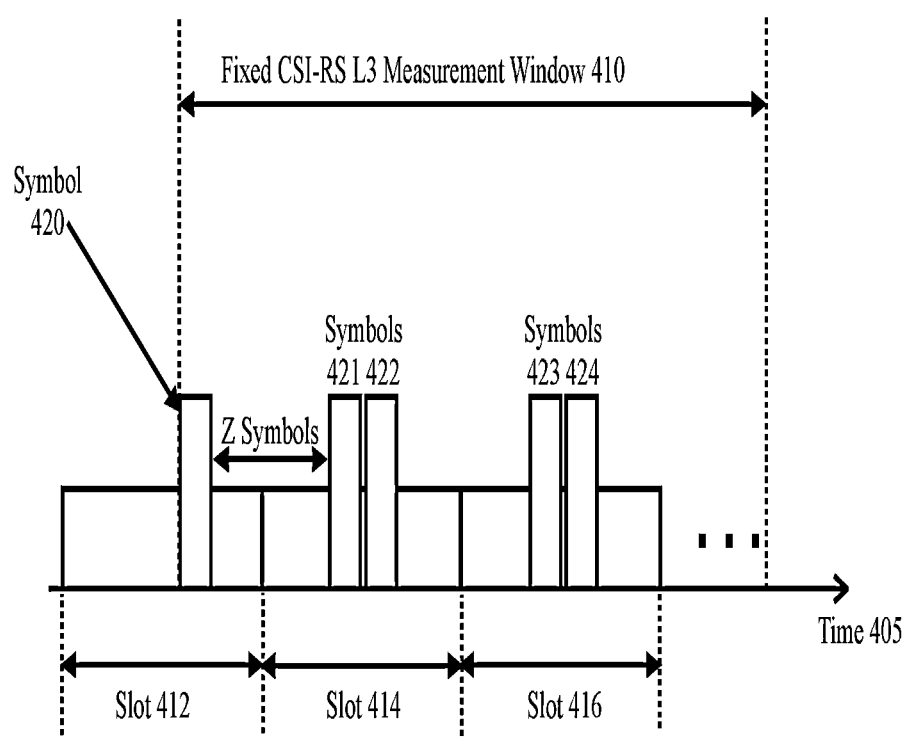

In FIG. 4d, slot 412 is shown as including symbol 420, slot 414 is shown as including two CSI-RS L3 symbols 421-422 and slot 416 is shown as including two CSI-RS L3 symbols 423-424.

As shown in FIG. 4d, in one example of a fixed measurement window, the starting point for the fixed CSI-RS L3 measurement window 410 is the starting boundary of a symbol which is a predetermined number of symbols (e.g., (Z) symbols) before the first configured CSI-RS L3 measurement resource 421. In this example, Z is expressed in symbols. However, in an actual deployment scenario, Z may be equal to any value expressed in any appropriate unit. In some embodiments, when the fixed CSI-RS L3 measurement window 410 is configured for intra-frequency measurements, the first CSI-RS L3 symbol 421 may be a serving cell CSI-RS. In other intra-frequency measurement embodiments, the first CSI-RS L3 symbol 421 may be the first arrived CSI-RS from any cell operating on this frequency. In further embodiments, when the fixed CSI-RS L3 measurement window 410 is configured for inter-frequency measurements, the first CSI-RS L3 symbols in 421 may be the first arrived CSI-RS from one of the neighbor cells operating on this frequency.

FIGS. 5a-5d each show an example of an adaptive CSI-RS L3 measurement window 510. With this approach, the measurement window duration may adapt to the configured CSI-RS L3 resources. These examples will be described with regard to a first configured CSI-RS L3 resource and a last CSI-RS L3 resource within the adaptive CSI-RS L3 measurement window 510. Like the example provided above, the first and last configured CSI-RS L3 resources may represent the first and last CSI-RS L3 resources in the burst of CSI-RS resources configured in the same measurement object. In some embodiments, when the adaptive CSI-RS L3 measurement window 510 is configured for intra-frequency measurements, the reference point of i) serving cell CSI-RS or ii) the first arrived CSI-RS from any cell operating on this frequency may be used for the adaptive CSI-RS L3 measurement window 510. In other embodiments, when the adaptive CSI-RS L3 measurement window 510 is configured for inter-frequency measurements, the reference point of the first arrived CSI-RS from one of the neighbor cells operating on this frequency may be used for the adaptive CSI-RS L3 measurement window 510.

As will be described in more detail below, FIGS. 5a-5d each show a different set of reference points being used as the starting point and ending point for the adaptive CSI-RS L3 measurement window 510. Since the measurement window is configured to adapt to the number of CSI-RS resources, the examples may include a different number of CSI-RS resources and/or show measurement windows with different lengths. In some embodiments, the adaptive CSI-RS L3 measurement window 510 may be restricted to a maximum duration (M) ms. However, these examples are merely provided for illustrative purposes, the exemplary embodiments apply to any appropriate number of CSI-RS measurement resources and a measurement window duration with any appropriate length.

Figure 5A:
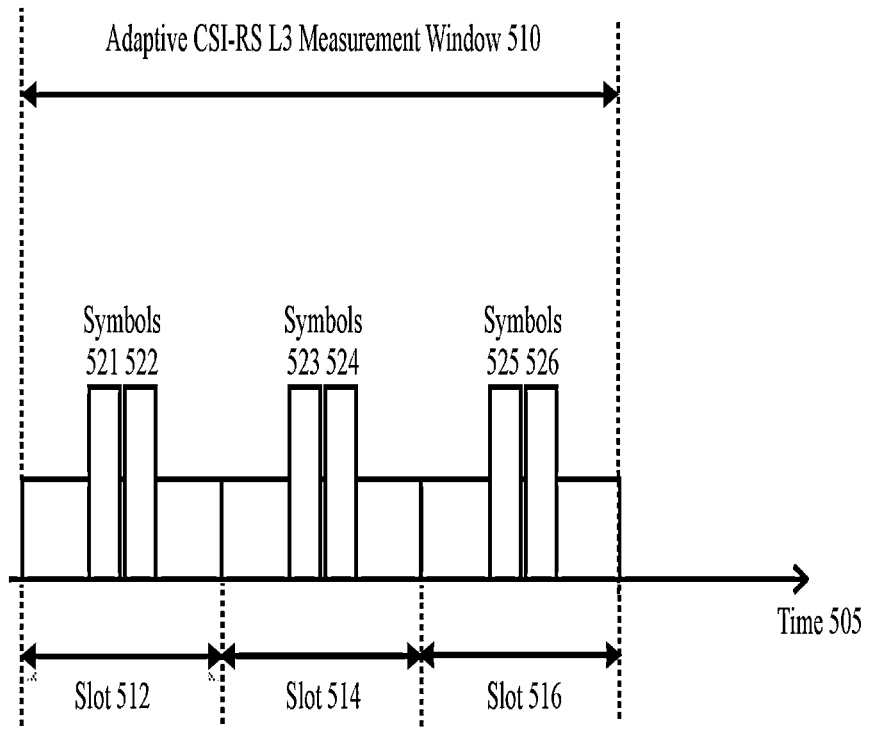
FIGS. 5a-5d each show an example of an adaptive CSI-RS L3 measurement window.

FIG. 5a includes the time domain 505, the adaptive CSI-RS measurement window 510 and three slots 512-516. Slot 512 includes two CSI-RS L3 symbols 521-522, slot 514 includes two CSI-RS L3 symbols 523-24 and slot 516 includes two CSI-RS L3 symbols 525-526. In this example, the CSI-RS L3 symbol 521 is the first configured CSI-RS resource and the CSI-RS L3 symbol 526 is the last configured CSI-RS resource.

As shown in FIG. 5a, in one example of an adaptive measurement window, the starting point is the starting boundary of the slot in which the first configured CSI-RS resource is located (slot 512). The ending point is the ending boundary of the slot in which the last configured CSI-RS resource is located slot 516.

Figure 5B:
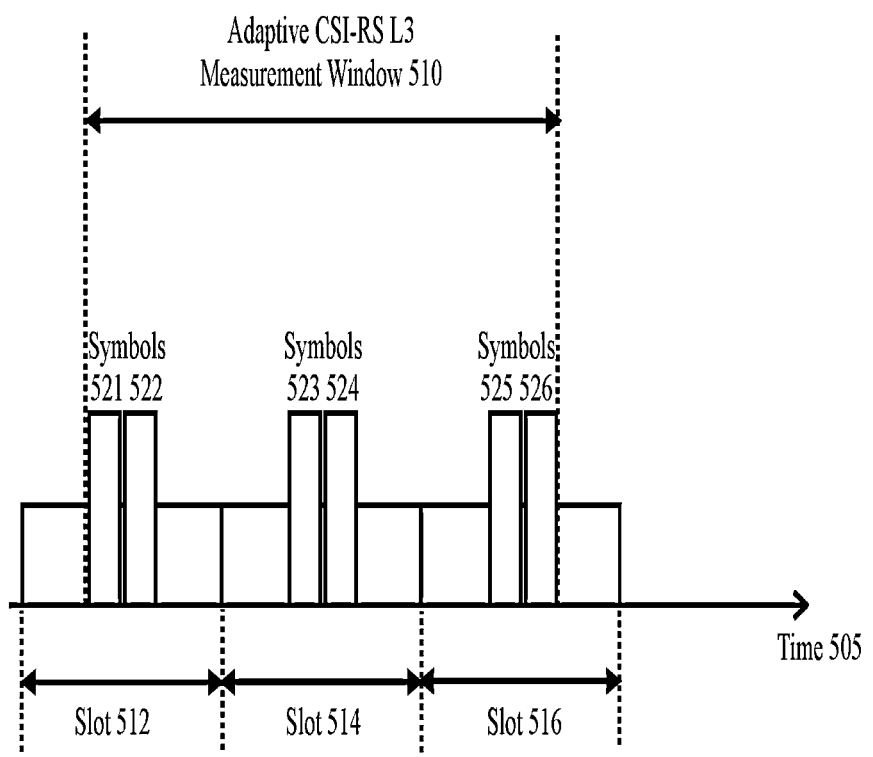

FIG. 5b includes the time domain 505, the adaptive CSI-RS measurement window 510 and three slots 512-516. Slot 512 includes two CSI-RS L3 symbols 521-522, slot 514 includes two CSI-RS L3 symbols 523-24 and slot 516 includes two CSI-RS L3 symbols 525-526. In this example, the CSI-RS L3 symbol 521 is the first configured CSI-RS resource and the CSI-RS L3 symbol 526 is the last configured CSI-RS resource.

As shown in FIG. 5b, in one example of an adaptive measurement window, the starting point is the starting boundary of the first configured CSI-RS resource (symbol 521) and the ending point is the ending boundary the last configured CSI-RS resource (symbol 526).

Figure 5C:
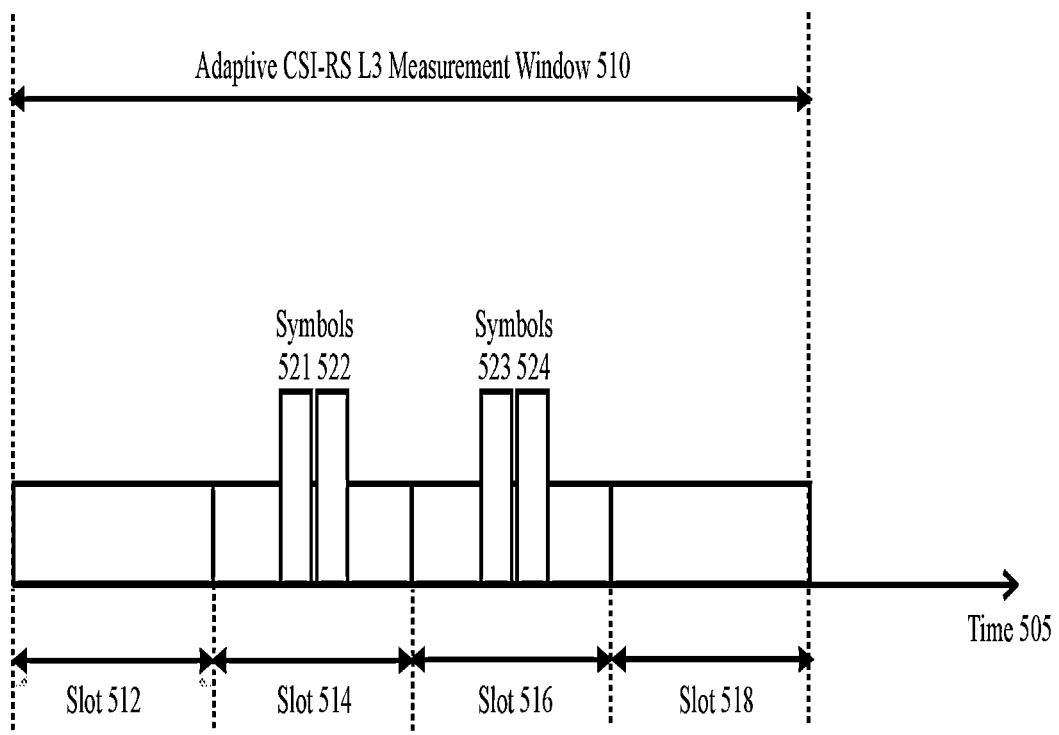

FIG. 5c includes the time domain 505, the adaptive CSI-RS measurement window 510 and four slots 512-518. Slots 512 and 518 are empty, Slot 514 includes two CSI-RS L3 symbols 521-522 and slot 516 includes two CSI-RS L3 symbols 523-24. In this example, the CSI-RS L3 symbol 521 is the first configured CSI-RS resource and the CSI-RS L3 symbol 524 is the last configured CSI-RS resource.

As shown in FIG. 5c, in one example of an adaptive measurement window, the starting point is the starting boundary of the slot which is a predetermined number of slots (e.g., (A1) slots) before the slot of the first configured CSI-RS L3 resource and the ending point is the ending boundary of the slot which is a predetermined number of slots (e.g., (A2) slots) after the slot of the last configured CSI-RS L3 resource. In this example, A1 and A2 are both equal to one slot. However, in an actual deployment scenario, A1 and A2 may be equal to any value expressed in any appropriate unit.

Figure 5D:
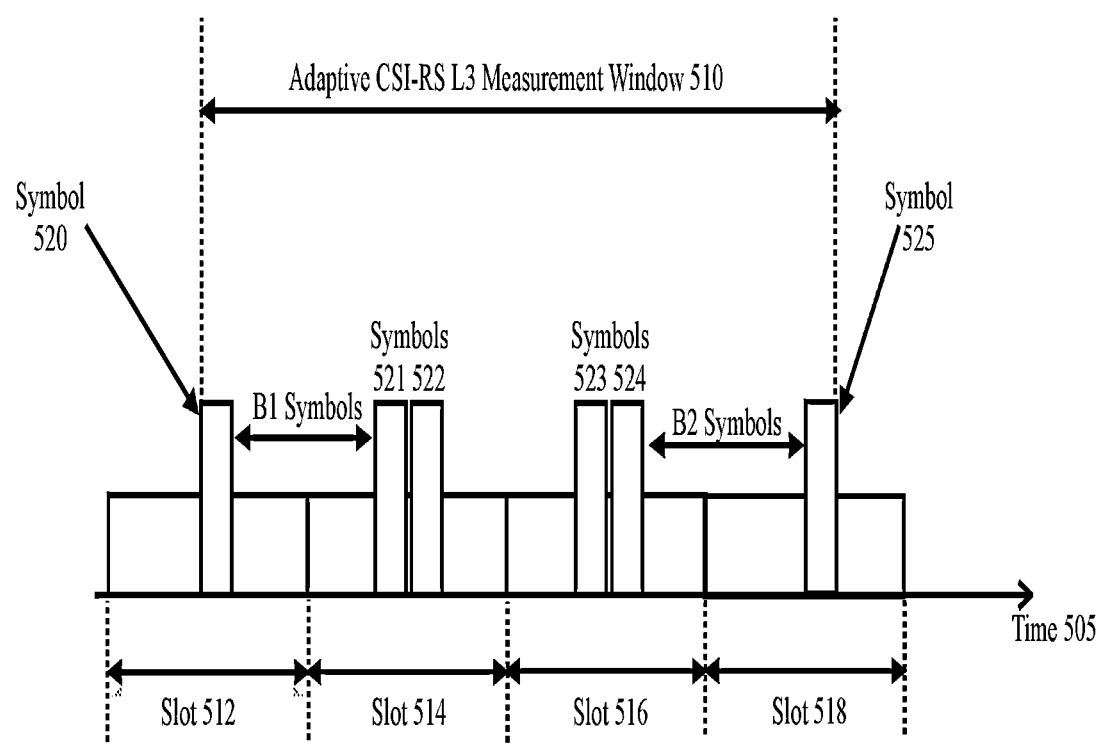

FIG. 5d includes the time domain 505, the adaptive CSI-RS measurement window 510 and four slots 512-518. Slots 512 includes CSI-RS resource 520, Slot 514 includes two CSI-RS L3 symbols 521-522, slot 516 includes two CSI-RS L3 symbols 523-24 and slot 518 includes CSI-RS resource 525. In this example, the CSI-RS L3 symbol 521 is the first configured CSI-RS resource and the CSI-RS L3 symbol 524 is the last configured CSI-RS resource.

As shown in FIG. 5d, in one example of an adaptive measurement window, the starting point is the starting boundary of the symbol which is a predetermined number of symbols (e.g., B1 symbols) before the first configured CSI-RS L3 resource and the ending point is the ending boundary of the symbol which is B2 after the last configured CSI-RS L3 resource. In this example, A1 and A2 are both expressed in symbols. However, in an actual deployment scenario, B1 and AB may be equal to any value expressed in any appropriate unit.

As mentioned above, the exemplary embodiments relate to implementing a coordination scheme for L1 and L3 measurement procedures. This coordination scheme accounts for scenarios in which there is a collision between L1 measurement operations and L3 measurement operations at the UE 210. From the perspective of the UE 210, the collision may occur based on the relationship between the CSI-RS L3 measurement window and the L1 measurement occasion. Specific examples of a collision between L1 and L3 measurement operations and the type of exemplary measurement resource sharing techniques that may be implemented will be described in detail below with regard to the method 600 of FIG. 6. The embodiments described below may be applicable to any of the CSI-RS L3 measurement window configurations described herein or any other appropriate type of measurement window.

Figure 6:
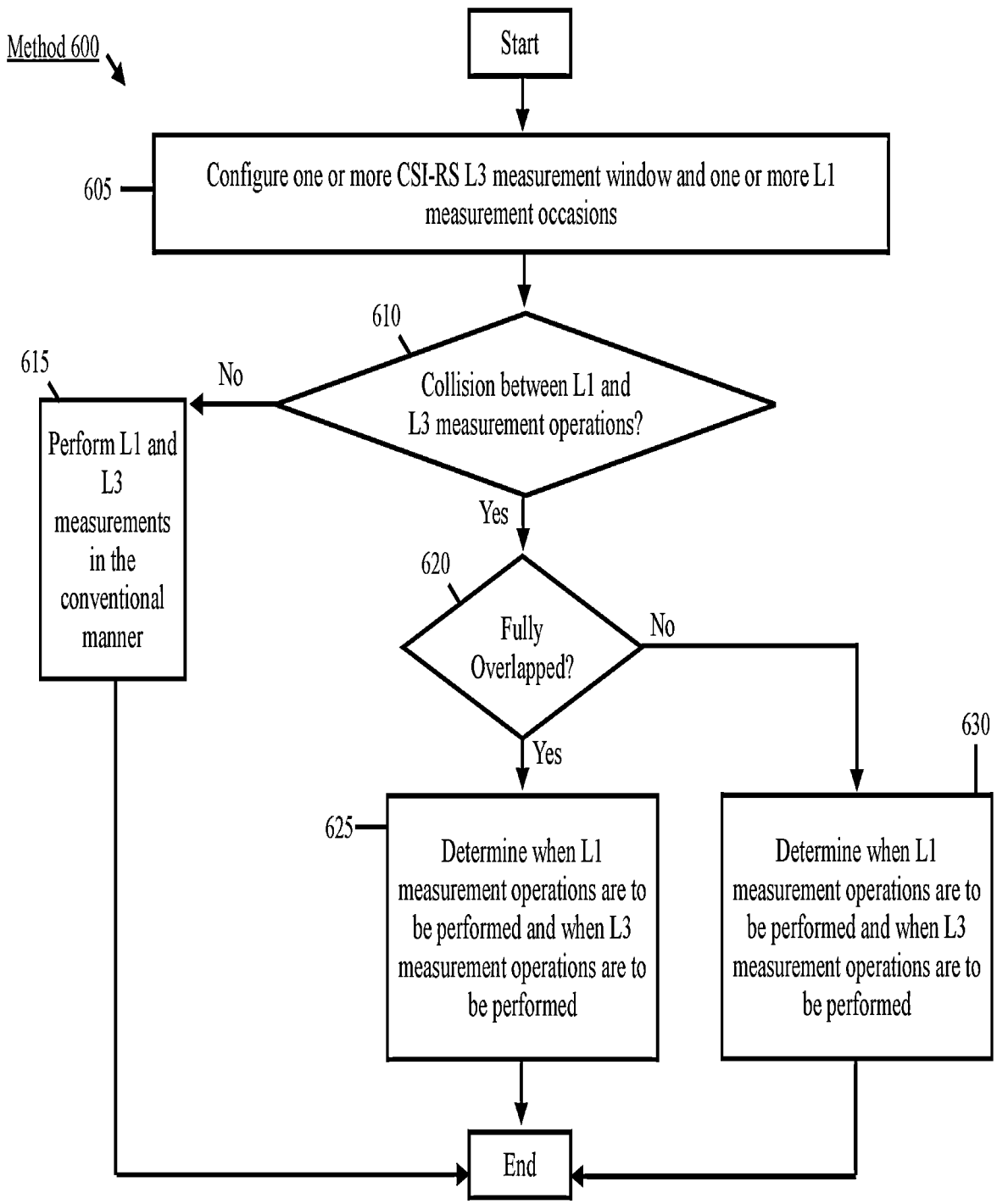
FIG. 6 shows a method for implementing a measurement resource coordination scheme according to various exemplary embodiments.

FIG. 6 shows a method 600 for implementing a measurement resource coordination scheme according to various exemplary embodiments.

In 605, the UE 210 configures one or more CSI-RS L3 measurement windows and one or more L1 measurement occasions. As mentioned above, the purpose of the CSI-RS L3 measurement window and the L1 measurement occasion and the manner in which these mechanisms are configured is beyond the scope of the exemplary embodiments. Instead, the exemplary embodiments relate to how the UE 210 is to manage the L1 and L3 measurement operations after these mechanisms have been configured.

In 610, the UE 210 determines whether there will be a collision between L1 and L3 measurement operations. Generally, the UE 210 may determine whether there is a collision based on whether any of the L1 measurement occasions overlap in time with any of the CSI-RS L3 measurement windows. The examples provided below will describe various different types of collisions that differ based on the extent of the overlap between the CSI-RS L3 measurement windows and the L1 measurement occasions.

Figure 7:
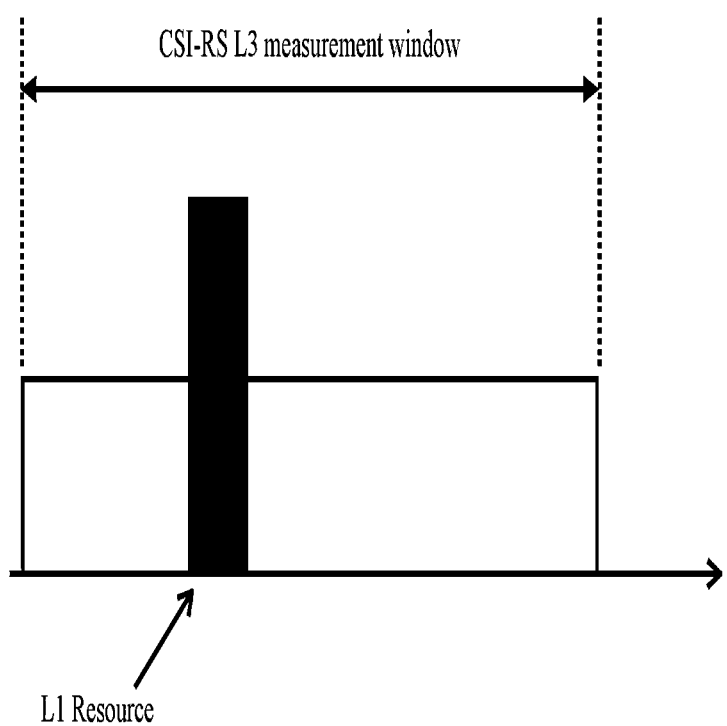
FIG. 7 illustrates a scenario in which a L1 resource fully overlaps with a CSI-RS L3 measurement window according to various exemplary embodiments.
Figure 8:
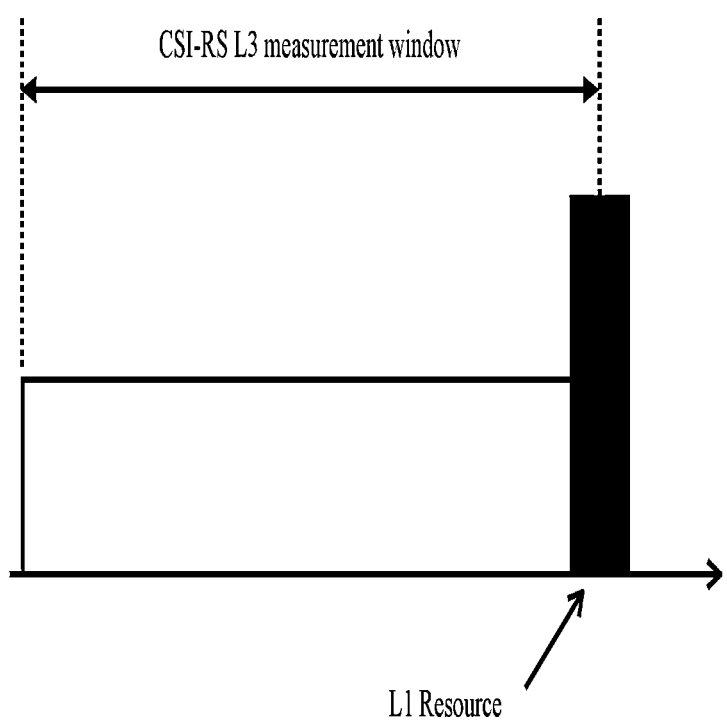
FIG. 8 illustrates a scenario in which a L1 resource partially overlaps with a CSI-RS measurement window according to various exemplary embodiments.

For a specific L1 resource (e.g., SSB, CSI-RS, etc.), the collision may be determined based on whether the L1 resource overlaps in time with a CSI-RS L3 measurement window. FIG. 7 illustrates a scenario 700 in which a L1 resource fully overlaps with a CSI-RS L3 measurement window according to various exemplary embodiments. FIG. 8 illustrates a scenario 800 in which a L1 resource partially overlaps with a CSI-RS measurement window according to various exemplary embodiments.

Figure 9:
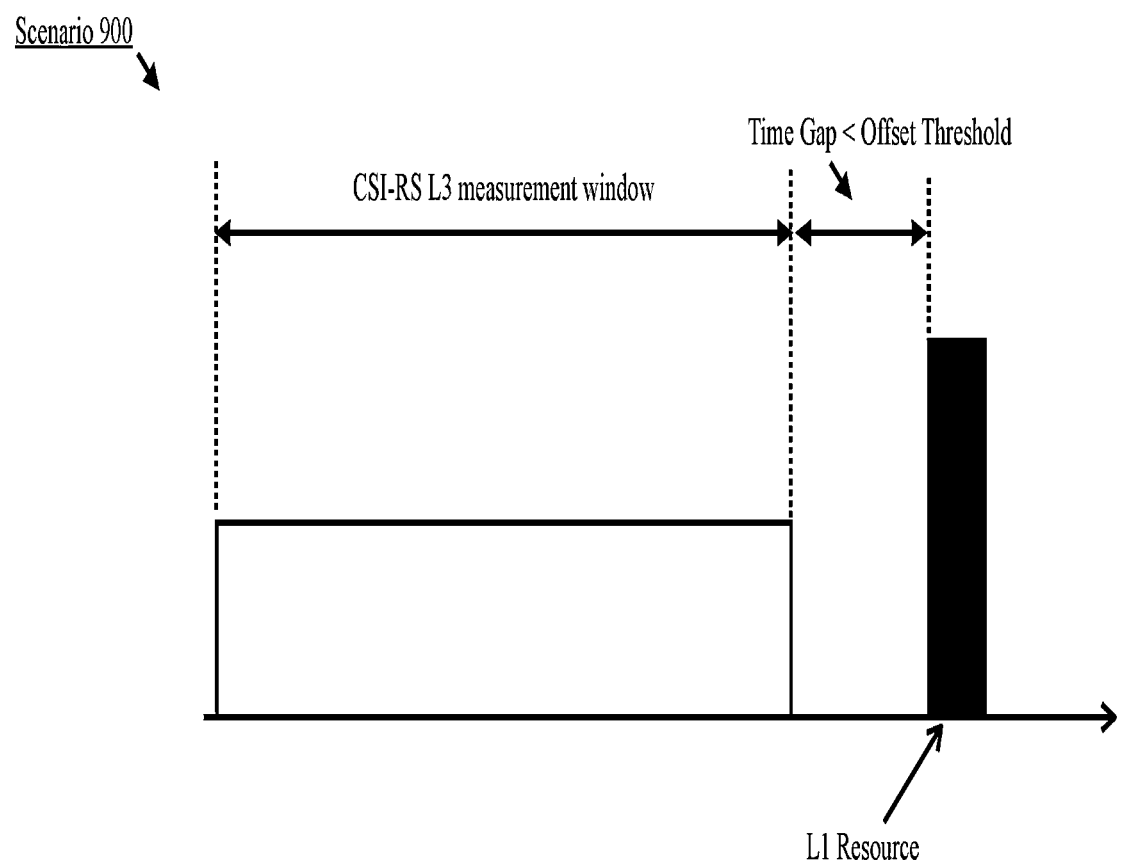
FIG. 9 illustrates a scenario in which an offset relative to a L1 resource overlaps in time with a CSI-RS L3 measurement window according to various exemplary embodiments.

In addition, a collision may also be defined based on whether an offset relative to the L1 resource overlaps in time with the CSI-RS L3 measurement window. This offset may be implemented to ensure that the UE 210 has enough time to perform the bandwidth adjustment that may be needed to receive and/or process the L1 resource. FIG. 9 illustrates a scenario 900 in which an offset relative to a L1 resource overlaps in time with a CSI-RS L3 measurement window according to various exemplary embodiments. In this example, the time duration between the L1 resource and the CSI-RS L3 measurement window is less than an offset threshold. Thus, if the time gap between L3 and L1 resources is smaller than the offset, the UE 210 may consider this a collision between L1 and L3 measurement operations.

Figure 10:
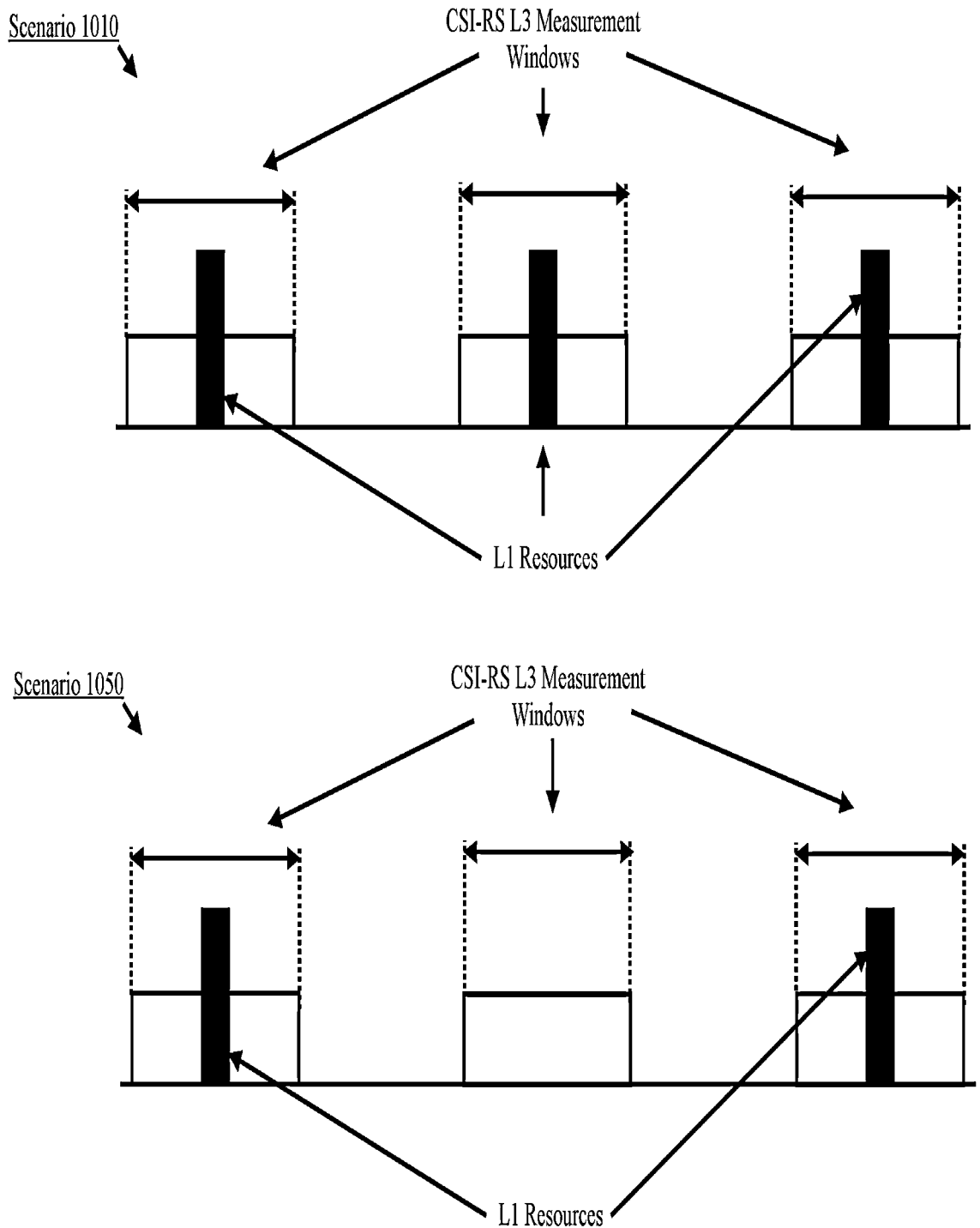
FIG. 10 illustrates two scenarios in which L1 resources are fully overlapped with CSI-RS L3 measurement windows according to various exemplary embodiments.

Returning to 610, if there is a collision, the method 600 continues to 620. In 620, the UE 210 determines whether all of the L1 resources within a set of L1 resources collide with multiple CSI-RS L3 measurement windows. For example, the UE 210 may consider the whole timeline (or any other appropriate duration of time) for the periodic or semi-persistent L1 resources (e.g., SSB, CSI-RS, etc.). A fully overlapped case occurs when all of the L1 resources collide with CSI-RS L3 measurement windows. FIG. 10 illustrates two scenarios 1010, 1050 in which L1 resources are fully overlapped with CSI-RS L3 measurement windows according to various exemplary embodiments.

Figure 11:
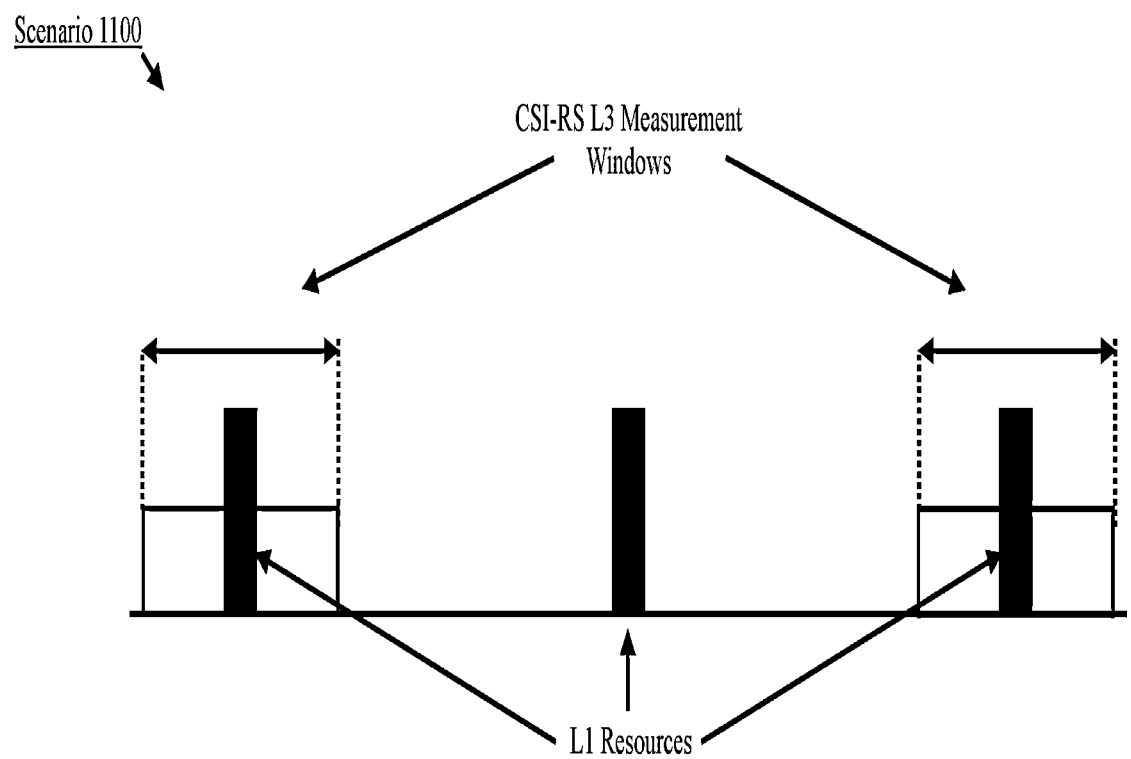
FIG. 11 illustrates a scenario in which L1 resources are partially overlapped with CSI-RS L3 measurement windows according to various exemplary embodiments.

A partially overlapped case occurs when a subset of the L1 resources collide with CSI-RS L3 measurement windows. FIG. 11 illustrates a scenario 1100 in which L1 resources are partially overlapped with CSI-RS L3 measurement windows according to various exemplary embodiments. As will be described below, in some exemplary embodiments, the UE 210 may implement certain techniques for a fully overlapped case and other different techniques for a partially overlapped case.

Figure 12:
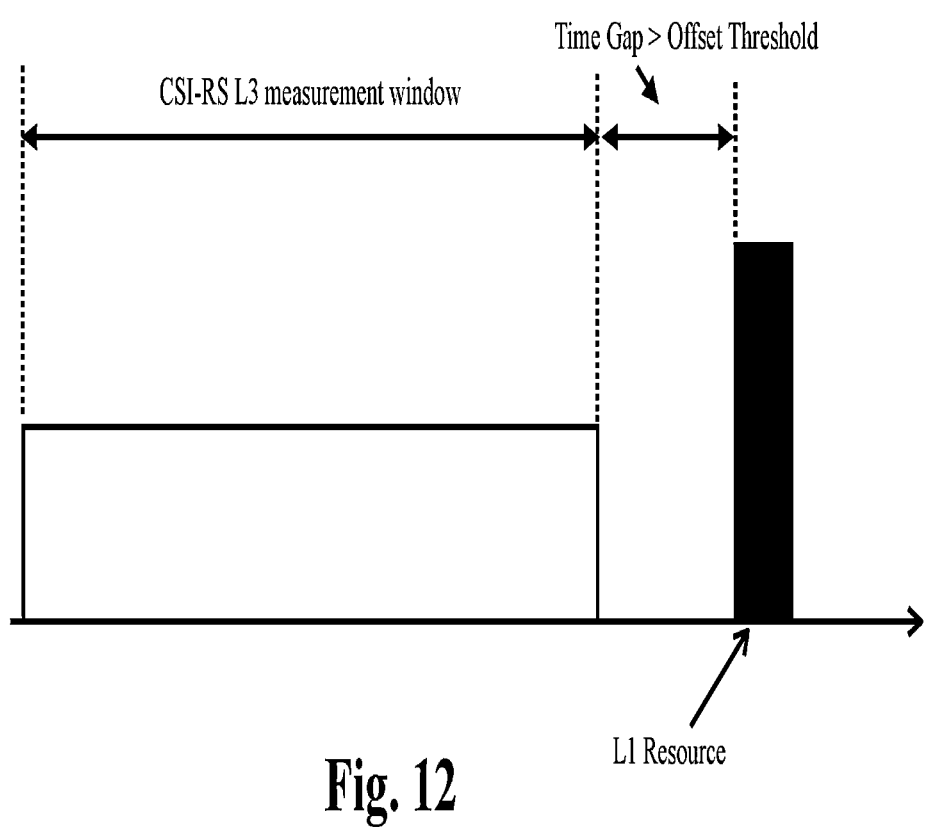
FIG. 12 illustrates a scenario where a L1 resources does not collide with a CSI-RS L3 measurement window according to various exemplary embodiments.

Returning to 610, if there is no collision, the method 600 continues to 615. FIG. 12 illustrates a scenario 1200 where a L1 resources does not collide with a CSI-RS L3 measurement window according to various exemplary embodiments. In this example, the L1 resources does not overlap at all with the CSI-RS L3 measurement window and the time gap between the CSI-RS L3 measurement window and the L1 resources is greater than the predetermined offset threshold.

Figure 13:
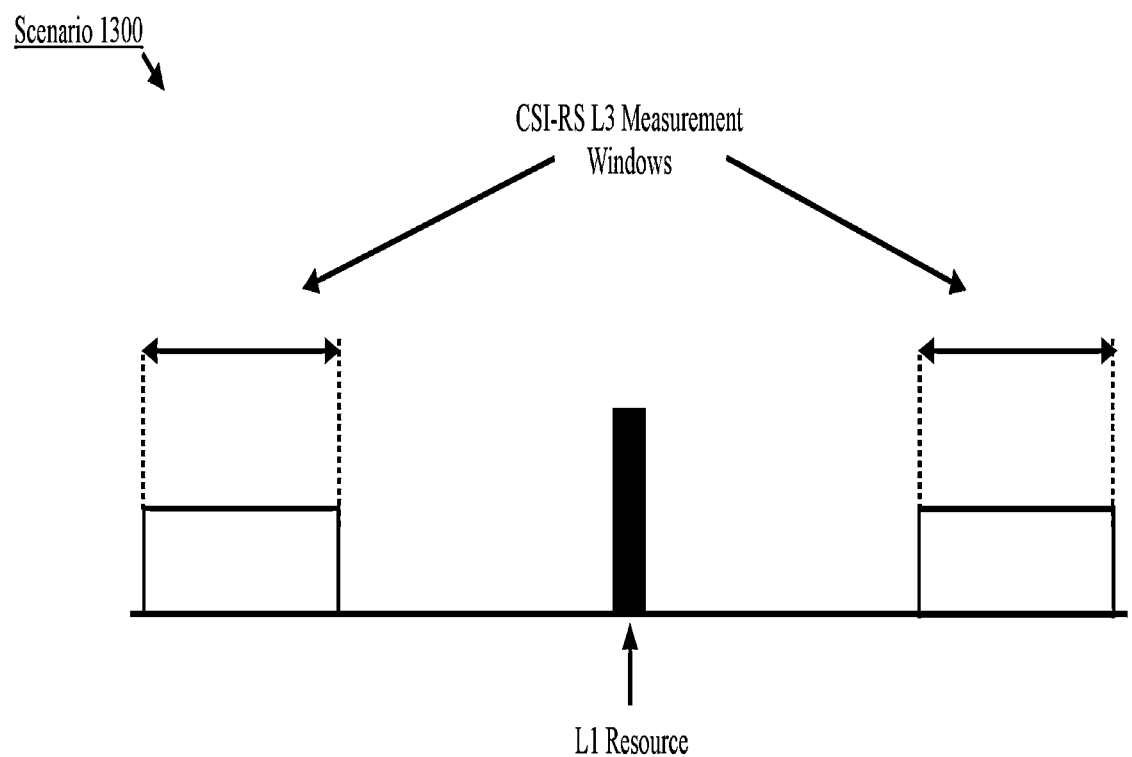
FIG. 13 illustrates a scenario in which L1 resources are fully non-overlapped with CSI-RS L3 measurement windows according to various exemplary embodiments.

Similar to the examples provided above, the UE 210 may also consider the whole timeline (or any other appropriate duration of time) for the periodic or semi-persistent L1 resources (e.g., SSB, CSI-RS, etc.). A fully non-overlapped case occurs when none of the L1 resources collide with CSI-RS L3 measurement windows. FIG. 13 illustrates a scenario 1300 in which L1 resources are fully non-overlapped with CSI-RS L3 measurement windows according to various exemplary embodiments.

Returning to the method 600, in 615, the UE 210 may perform the L1 and the L3 measurements in the conventional manner. Since there is no collision, the UE 210 should be to switch between L3 and L1 measurements without causing a degradation in performance. Subsequently, the method 600 ends.

Returning to 620, if all of the L1 resources within a set of L1 resources collide with multiple CSI-RS L3 measurement windows, e.g., a fully overlapped case, the method 600 continues to 625.

In 625, the UE 210 determines when L1 measurement operations are to be performed and when L3 measurement operations are to be performed. To provide an example, the UE 210 may use a pair of sharing factors (k1) and (k2) to determine which overlapped occasions are to be used for CSI-RS L3 measurements and which overlapped occasions are to be used for L1 measurements.

In some embodiments, for (L) overlapped occasions, the UE may use (H) occasions out of (L) for CSI-RS L3 measurement where K1=L/H. The parameter K1 may be used by the UE 210 to determine the total measurement period extension for CSI-RS L3 due to this measurement sharing. The measurement extension may cause the CSI-RS L3 measurement window to extend to encompass a greater number of symbols because some of the symbols in the current CSI-RS L3 measurement window will be skipped for the purposes of CSI-RS L3 measurements.

In some embodiments, for (L) overlapped occasions, the UE 210 may use the rest of (L−H) occasions out of L for L1 measurements. Thus, K2=L/L−H. The parameter K2 may be used to decide the total measurement period extension for L1 due to this measurement sharing. Subsequently, the method 600 ends.

Figure 14:
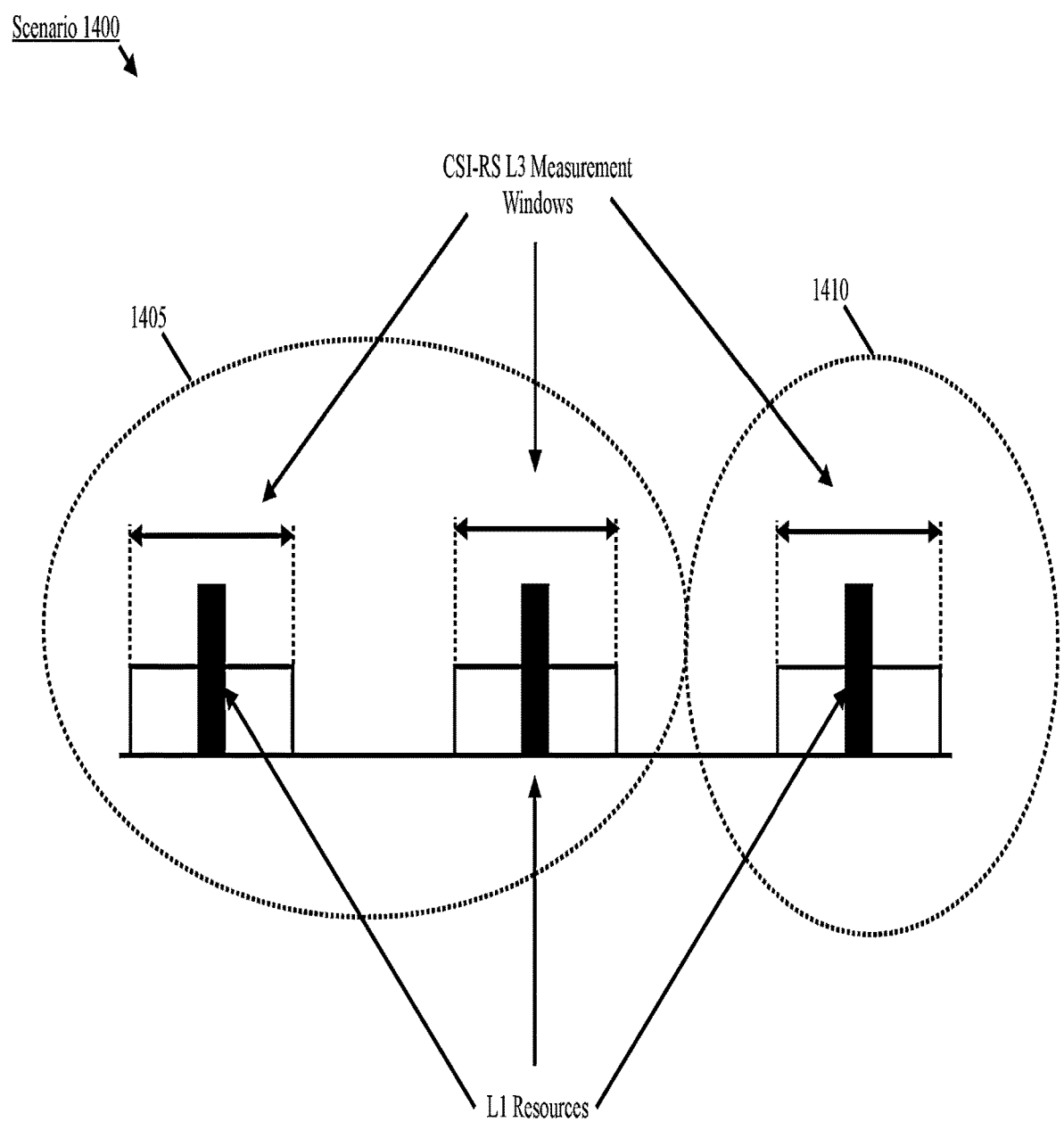
FIG. 14 shows a scenario that illustrates a fully overlapped case according to various exemplary embodiments.

FIG. 14 shows a scenario 1400 that illustrates a fully overlapped case according to various exemplary embodiments. In this example, L=3 and H=2. Thus, the UE 210 may use two overlapped occasions out of three for CSI-RS L3 measurements. These occasions are identified by the circle marked with reference number 1405. The UE 210 may omit the L1 measurements during these instances. In this example, K1=1.5 and thus, the total measurement period could be extended by 1.5.

In addition, the UE 210 may use one overlapped occasion out of three for L1 measurements. This occasion is identified by the circle marked with reference number 1410. The UE 210 may omit the L3 measurements during these instances. Here, K2=3 and this, the total measurement period may be extended to three. This example is merely one possible arrangement and is not intended to limit the exemplary embodiments in any way, those skilled in the art will understand how the exemplary concepts described herein will be applicable to other types of scenarios.

Returning to 620, if at least one L1 resource from a set of L1 resources collides with at least one CSI-RS L3 measurement window, e.g., a partially overlapped case, the method 600 continues to 630.

In 630, the UE 210 determines when L1 measurement operations are to be performed and when L3 measurement operations are to be performed. In this example, the UE 210 may perform CSI-RS L3 measurements during CSI-RS L3 measurement windows and the UE 210 will perform L1 measurement outside of CSI-RS L3 measurement windows. Subsequently, the method 600 ends.

Figure 15:
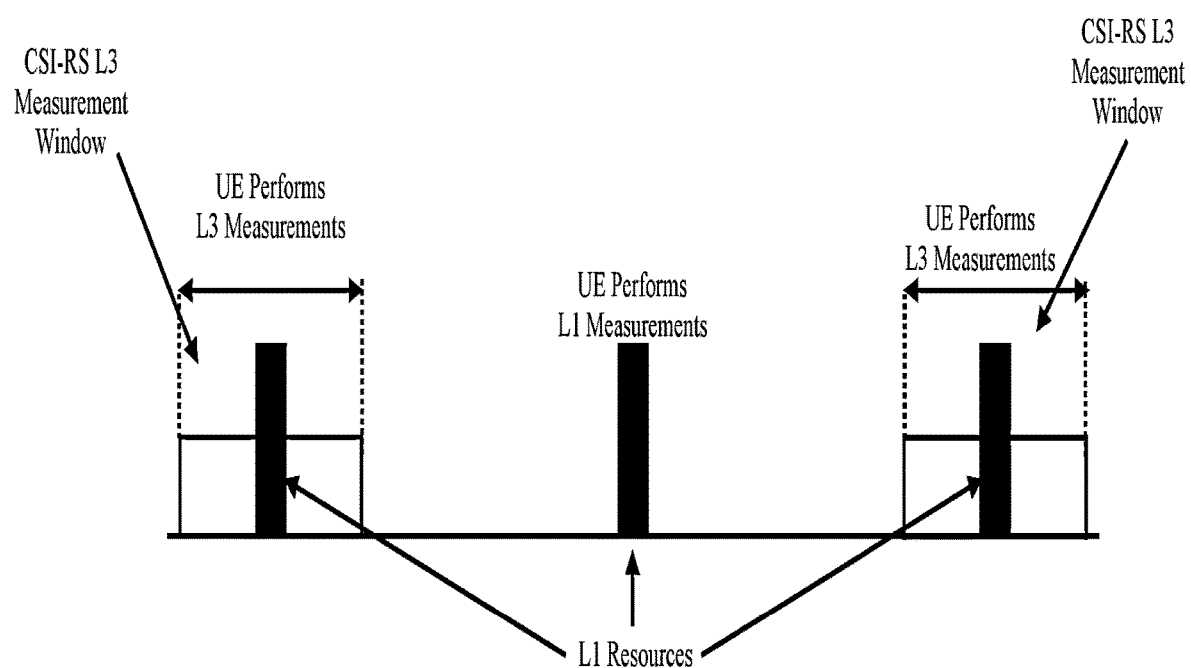
FIG. 15 shows a scenario that illustrates a partially overlapped case according to various exemplary embodiments.

FIG. 15 shows a scenario 1500 that illustrates a partially overlapped case according to various exemplary embodiments. In this example, despite the collision between the L1 measurement occasion and the CSI-RS L3 measurement windows, the UE 210 only performs CSI-RS L3 measurements during the CSI-RS L3 measurement windows and omits the L1 measurements. The L1 measurements are performed when the L1 resources are located outside of the CSI-RS L3 measurement windows.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as ios, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus comprising processing circuitry configured to:
- determine a channel state information-reference signal (CSI-RS) layer 3 (L3) measurement window, wherein a starting point of the CSI-RS L3 measurement window is a slot boundary of a serving cell in which a first configured CSI-RS resource of the serving cell is located; and
- process CSI-RS L3 measurements during the CSI-RS L3 measurement window.

2. The apparatus of claim 1, wherein the CSI-RS L3 measurement window has a predetermined fixed duration.

3. The apparatus of claim 1, wherein the CSI-RS L3 measurement window has a variable duration, wherein the variable duration is not greater than a predetermined maximum duration.

4. The apparatus of claim 1, wherein the CSI-RS L3 measurements comprise intra-frequency measurements.

5. The apparatus of claim 1, wherein the processing circuitry is further configured to:
- process, based on signals received from a network, a measurement object (MO) identifying the serving cell.

6. The apparatus of claim 5, wherein the MO identifies a plurality of serving cells and the serving cell is one of the plurality of serving cells in the MO having a L3 CSI-RS resource with a smallest offset.

7. The apparatus of claim 1, wherein the CSI-RS L3 measurement window comprises two CSI-RS L3 measurement windows.

8. The apparatus of claim 7, wherein the starting point of a first CSI-RS L3 measurement window is the slot boundary of the serving cell in which the first configured CSI-RS resource of the serving cell is located and a starting point of a second CSI-RS L3 measurement window is determined based on the starting point of the first CSI-RS L3 measurement window.

9. The apparatus of claim 8, wherein the starting point of a second CSI-RS L3 measurement window is an offset of half of the CSI-RS periodicity in slots in relation to the starting point of the first window.

10. A user equipment (UE), comprising:
- a transceiver configured to communicate with a network; and
- a processor communicatively coupled to the transceiver and configured to:
  - determine a channel state information-reference signal (CSI-RS) layer 3 (L3) measurement window, wherein a starting point of the CSI-RS L3 measurement window is a slot boundary of a serving cell in which a first configured CSI-RS resource of the serving cell is located; and
  - process CSI-RS L3 measurements during the CSI-RS L3 measurement window.

11. The UE of claim 10, wherein the CSI-RS L3 measurement window has a predetermined fixed duration.

12. The UE of claim 10, wherein the CSI-RS L3 measurement window has a variable duration, wherein the variable duration is not greater than a predetermined maximum duration.

13. The UE of claim 10, wherein the CSI-RS L3 measurements comprise intra-frequency measurements.

14. The UE of claim 10, wherein the processor is further configured to:
- process, based on signals received from the network, a measurement object (MO) identifying the serving cell.

15. The UE of claim 14, wherein the MO identifies a plurality of serving cells and the serving cell is one of the plurality of serving cells in the MO having a L3 CSI-RS resource with a smallest offset.

16. The UE of claim 10, wherein the CSI-RS L3 measurement window comprises two CSI-RS L3 measurement windows.

17. The UE of claim 16, wherein the starting point of a first CSI-RS L3 measurement window is the slot boundary of the serving cell in which the first configured CSI-RS resource of the serving cell is located and a starting point of a second CSI-RS L3 measurement window is determined based on the starting point of the first window.

18. The UE of claim 17, wherein the starting point of a second CSI-RS L3 measurement window is an offset of half of the CSI-RS periodicity in slots in relation to the starting point of the first window.

* * * * *